(12) United States Patent
Shapiro et al.

(10) Patent No.: US 11,092,029 B2
(45) Date of Patent: Aug. 17, 2021

(54) SHROUD HANGER ASSEMBLY

(71) Applicant: General Electric Company, Schenectady, NY (US)

(72) Inventors: Jason David Shapiro, Shapiro, MA (US); Jonathan David Baldiga, Lynn, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/531,775

(22) Filed: Aug. 5, 2019

(65) Prior Publication Data
US 2019/0353048 A1  Nov. 21, 2019

Related U.S. Application Data

(62) Division of application No. 15/318,114, filed as application No. PCT/US2015/029236 on May 5, 2015, now Pat. No. 10,400,619.
(Continued)

(51) Int. Cl.
*F01D 11/08* (2006.01)
*F01D 11/12* (2006.01)
*F01D 25/24* (2006.01)

(52) U.S. Cl.
CPC .............. *F01D 11/12* (2013.01); *F01D 11/08* (2013.01); *F01D 25/246* (2013.01);
(Continued)

(58) Field of Classification Search
CPC ........ F01D 11/00; F01D 11/08; F01D 25/246; F01D 11/12; F01D 11/122; F01D 11/125;
(Continued)

(56) References Cited

U.S. PATENT DOCUMENTS 3,583,824 A  6/1971  Smuland et al.
3,778,185 A  12/1973  Plowman et al.
(Continued)

FOREIGN PATENT DOCUMENTS

CA  2520792 A1  3/2006
CN  1219215 A  6/1999
(Continued)

OTHER PUBLICATIONS

PCT Search Report and Written Opinion issued in connection with related PCT Application No. PCT/US2015/027247 dated Jul. 10, 2015.
(Continued)

*Primary Examiner* — Richard A Edgar
(74) *Attorney, Agent, or Firm* — Dority & Manning, P.A.

(57) ABSTRACT

A shroud hanger assembly or shroud assembly is provided for a gas turbine engine wherein a hanger includes a radially depending and axially extending arm. The arm or retainer engages a pocket formed in a shroud so as to retain the shroud in a desired position relative to the hanger. An aft retaining structure is provided on the hanger and provides a seat for a seal structure which biases the retainer so that the arm of the hanger maintains engagement in the shroud pocket. A baffle may be utilized at the hanger to cool at least some portion of the shroud.

17 Claims, 4 Drawing Sheets

Related U.S. Application Data

(60) Provisional application No. 62/011,241, filed on Jun. 12, 2014.

(52) U.S. Cl.
CPC ...... *F05D 2220/32* (2013.01); *F05D 2240/55* (2013.01); *F05D 2300/6033* (2013.01); *Y02T 50/60* (2013.01)

(58) Field of Classification Search
CPC ............. F05D 2240/11; F05D 2240/14; F05D 2240/15
See application file for complete search history.

(56) References Cited

U.S. PATENT DOCUMENTS

| | | | |
|---|---|---|---|
| 4,087,199 A | 5/1978 | Hemsworth et al. | |
| 4,460,311 A | 7/1984 | Trappmann et al. | |
| 4,596,116 A | 6/1986 | Mandet et al. | |
| 4,759,687 A | 7/1988 | Miraucourt et al. | |
| 4,863,345 A | 9/1989 | Thompson et al. | |
| 5,048,288 A | 9/1991 | Bessette et al. | |
| 5,074,748 A | 12/1991 | Hagle | |
| 5,080,557 A | 1/1992 | Berger | |
| 5,127,793 A | 7/1992 | Walker et al. | |
| 5,137,421 A | 8/1992 | Hayton | |
| 5,154,577 A | 10/1992 | Kellock et al. | |
| 5,169,287 A | 12/1992 | Proctor et al. | |
| 5,188,507 A | 2/1993 | Sweeney | |
| 5,197,853 A | 3/1993 | Creevy et al. | |
| 5,423,659 A | 6/1995 | Thompson | |
| 5,553,999 A | 9/1996 | Proctor et al. | |
| 5,593,277 A | 1/1997 | Proctor et al. | |
| 5,655,876 A | 8/1997 | Rock et al. | |
| 5,738,490 A | 4/1998 | Pizzi | |
| 5,780,146 A | 7/1998 | Mason et al. | |
| 5,964,575 A | 10/1999 | Marey | |
| 6,113,349 A | 9/2000 | Bagepalli et al. | |
| 6,164,656 A | 12/2000 | Frost | |
| 6,290,459 B1 | 9/2001 | Correia | |
| 6,302,642 B1 | 10/2001 | Nagler et al. | |
| 6,315,519 B1 | 11/2001 | Bagepalli et al. | |
| 6,340,285 B1 | 1/2002 | Gonyou et al. | |
| 6,402,466 B1 | 6/2002 | Burdgick et al. | |
| 6,412,149 B1 | 7/2002 | Overberg | |
| 6,503,051 B2 | 1/2003 | Predmore | |
| 6,503,574 B1 | 1/2003 | Skelly et al. | |
| 6,699,011 B2 | 3/2004 | Cot et al. | |
| 6,702,550 B2 | 3/2004 | Darkins, Jr. et al. | |
| 6,733,233 B2 | 5/2004 | Jasklowski et al. | |
| 6,733,235 B2 * | 5/2004 | Alford | F01D 11/08 415/173.1 |
| 6,758,653 B2 | 7/2004 | Morrison | |
| 6,808,363 B2 | 10/2004 | Darkins, Jr. et al. | |
| 6,821,085 B2 | 11/2004 | Darkins, Jr. et al. | |
| 6,884,026 B2 | 4/2005 | Glynn et al. | |
| 6,887,528 B2 | 5/2005 | Lau et al. | |
| 6,893,214 B2 | 5/2005 | Alford et al. | |
| 6,942,203 B2 | 9/2005 | Schroder et al. | |
| 7,011,493 B2 | 3/2006 | Marchi et al. | |
| 7,052,235 B2 | 5/2006 | Alford et al. | |
| 7,217,089 B2 | 5/2007 | Durocher et al. | |
| 7,238,002 B2 | 7/2007 | Cairo et al. | |
| 7,270,518 B2 | 9/2007 | Barb et al. | |
| 7,278,820 B2 | 10/2007 | Keller | |
| 7,556,475 B2 | 7/2009 | Roberts, III et al. | |
| 7,563,071 B2 | 7/2009 | Campbell et al. | |
| 7,595,114 B2 | 9/2009 | Meschter et al. | |
| 7,686,577 B2 | 3/2010 | Morrison et al. | |
| 7,726,936 B2 | 6/2010 | Keller et al. | |
| 7,749,565 B2 | 7/2010 | Johnson et al. | |
| 7,753,643 B2 | 7/2010 | Gonzalez et al. | |
| 7,819,625 B2 | 10/2010 | Merrill et al. | |
| 7,871,244 B2 | 1/2011 | Marini et al. | |
| 7,908,867 B2 | 3/2011 | Keller et al. | |
| 7,950,234 B2 | 5/2011 | Radonovich et al. | |
| 7,968,217 B2 | 6/2011 | Sarrafi-Nour et al. | |
| 8,047,773 B2 | 11/2011 | Bruce et al. | |
| 8,079,807 B2 | 12/2011 | Shapiro et al. | |
| 8,118,546 B2 | 2/2012 | Morrison | |
| 8,128,350 B2 | 3/2012 | Schiavo et al. | |
| 8,167,546 B2 | 5/2012 | Shi et al. | |
| 8,246,299 B2 | 8/2012 | Razzell et al. | |
| 8,303,245 B2 | 11/2012 | Foster et al. | |
| 8,303,247 B2 | 11/2012 | Schlichting et al. | |
| 8,328,505 B2 | 12/2012 | Shi et al. | |
| 8,511,975 B2 | 8/2013 | Shi et al. | |
| 8,834,106 B2 | 9/2014 | Luczak | |
| 8,985,944 B2 | 3/2015 | Shapiro et al. | |
| 10,400,619 B2 * | 9/2019 | Shapiro | F01D 11/12 |
| 2002/0127108 A1 | 9/2002 | Crall et al. | |
| 2003/0031557 A1 | 2/2003 | Arilla et al. | |
| 2003/0215328 A1 | 11/2003 | McGrath et al. | |
| 2004/0005216 A1 | 1/2004 | Suzumura et al. | |
| 2004/0005452 A1 | 1/2004 | Dorfman et al. | |
| 2004/0219011 A1 | 11/2004 | Albers et al. | |
| 2005/0003172 A1 | 1/2005 | Wheeler et al. | |
| 2005/0111965 A1 | 5/2005 | Lowe et al. | |
| 2005/0129499 A1 | 6/2005 | Morris et al. | |
| 2005/0141989 A1 | 6/2005 | Sayegh et al. | |
| 2006/0078429 A1 | 4/2006 | Darkins, Jr. et al. | |
| 2006/0083607 A1 | 4/2006 | Synnott et al. | |
| 2006/0110247 A1 | 5/2006 | Nelson et al. | |
| 2006/0110248 A1 | 5/2006 | Nelson et al. | |
| 2006/0292001 A1 | 12/2006 | Keller et al. | |
| 2007/0031245 A1 | 2/2007 | Ruthemeyer et al. | |
| 2007/0154307 A1 | 7/2007 | Cairo | |
| 2008/0025838 A1 | 1/2008 | Marini et al. | |
| 2008/0206542 A1 | 8/2008 | Vance et al. | |
| 2009/0010755 A1 | 1/2009 | Keller et al. | |
| 2009/0053045 A1 | 2/2009 | Nowak et al. | |
| 2009/0208322 A1 | 8/2009 | McCaffrey | |
| 2009/0324393 A1 | 12/2009 | Gonzalez et al. | |
| 2011/0182720 A1 | 7/2011 | Kojima et al. | |
| 2011/0274538 A1 | 11/2011 | Shi et al. | |
| 2011/0293410 A1 | 12/2011 | Marusko et al. | |
| 2011/0299976 A1 | 12/2011 | Uskert | |
| 2011/0318171 A1 | 12/2011 | Albers et al. | |
| 2012/0082540 A1 | 4/2012 | Dziech et al. | |
| 2012/0107122 A1 | 5/2012 | Albers et al. | |
| 2012/0156029 A1 | 6/2012 | Karafillis et al. | |
| 2012/0171023 A1 | 7/2012 | Albers et al. | |
| 2012/0171027 A1 | 7/2012 | Albers et al. | |
| 2012/0247124 A1 | 10/2012 | Shapiro et al. | |
| 2012/0260670 A1 | 10/2012 | Foster et al. | |
| 2012/0263582 A1 | 10/2012 | Foster et al. | |
| 2012/0275898 A1 | 11/2012 | McCaffrey et al. | |
| 2013/0000324 A1 | 1/2013 | Alvanos et al. | |
| 2013/0004306 A1 | 1/2013 | Albers et al. | |
| 2013/0011248 A1 | 1/2013 | Croteau et al. | |
| 2013/0017057 A1 | 1/2013 | Lagueux | |
| 2013/0156550 A1 | 6/2013 | Franks et al. | |
| 2013/0156556 A1 | 6/2013 | Franks et al. | |
| 2013/0266435 A1 | 10/2013 | Foster et al. | |
| 2014/0255170 A1 | 9/2014 | Hillier | |
| 2014/0271144 A1 | 9/2014 | Landwehr et al. | |
| 2014/0271145 A1 | 9/2014 | Thomas et al. | |
| 2014/0294571 A1 | 10/2014 | Hillier | |
| 2014/0294572 A1 | 10/2014 | Hillier et al. | |
| 2014/0308113 A1 | 10/2014 | Westphal et al. | |
| 2015/0016970 A1 | 1/2015 | Smith et al. | |
| 2015/0377035 A1 | 12/2015 | Freeman et al. | |
| 2016/0251982 A1 | 9/2016 | Shapiro | |

FOREIGN PATENT DOCUMENTS

| | | |
|---|---|---|
| CN | 1542259 A | 11/2004 |
| CN | 101315033 A | 12/2008 |
| CN | 102135020 A | 7/2011 |
| EP | 0770761 A1 | 5/1997 |
| EP | 1225309 A1 | 7/2002 |
| EP | 1548144 A1 | 6/2005 |
| EP | 1801361 A1 | 6/2007 |

(56) References Cited

FOREIGN PATENT DOCUMENTS

| | | |
|---|---|---|
| EP | 2631434 A2 | 8/2013 |
| EP | 2774905 A1 | 9/2014 |
| FR | 2540938 A1 | 8/1984 |
| FR | 2580033 A1 | 10/1986 |
| FR | 2942844 A1 | 9/2010 |
| GB | 2397102 A | 7/2004 |
| JP | 5710710 A | 1/1982 |
| JP | 63239301 A | 10/1988 |
| JP | 05141270 A | 6/1993 |
| JP | 0913904 A | 1/1997 |
| JP | 10103014 A | 4/1998 |
| JP | 2002276301 A | 9/2002 |
| JP | 2004036443 A | 2/2004 |
| JP | 2005155626 A | 6/2005 |
| JP | 2006105393 A | 4/2006 |
| JP | 2007046603 A | 2/2007 |
| JP | 2007182881 A | 7/2007 |
| JP | 2012211582 | 11/2012 |
| JP | 2013170578 A | 9/2013 |
| WO | 02099254 A1 | 12/2002 |
| WO | 03026886 A2 | 4/2003 |
| WO | 2013163505 A1 | 10/2013 |
| WO | 2014130762 A1 | 8/2014 |
| WO | 2014186099 A1 | 11/2014 |

OTHER PUBLICATIONS

PCT Search Report and Written Opinion issued in connection with corresponding PCT Application No. PCT/US2015/029236 dated Jul. 20, 2015.

PCT Search Report and Written Opinion issued in connection with related PCT Application No. PCT/US2015/029342 dated Jul. 22, 2015.

PCT Search Report and Written Opinion issued in connection with related PCT Application No. PCT/US2015/028050 dated Aug. 11, 2015.

European Search Report and Opinion issued in connection with related EP Application No. 16155655.0 dated Aug. 1, 2016.

PCT Search Report and Written Opinion issued in connection with related PCT Application No. PCT/US2014/035089 dated Jul. 1, 2014.

U.S. Non-Final Office Action issued in connection with related U.S. Appl. No. 13/327,349 dated Jul. 22, 2014.

U.S. Non-Final Office Action issued in connection with related U.S. Appl. No. 13/402,616 dated Jul. 24, 2014.

U.S. Non-Final Office Action issued in connection with related U.S. Appl. No. 13/327,349 dated Jan. 27, 2015.

PCT Search Report and Written Opinion issued in connection with related PCT Application No. PCT/US2014/068490 dated Mar. 5, 2015.

Chinese office action issued in connection with related CN Application No. 201210541477.1 dated May 12, 2015.

Chinese office action issued in connection with related CN Application No. 201310056712.0 dated Jun. 19, 2015.

European Search Report and opinion issued in connection with related EP Application No. 12195953.0 dated Jul. 22, 2015.

Chinese Office Action issued in connection with related CN Application No. 201480028735.3 dated Sep. 5, 2016.

Japanese Office Action issued in connection with related JP Application No. 2012269895 dated Oct. 4, 2016.

Japanese Office Action issued in connection with related JP Application No. 2013027200 dated Oct. 18, 2016.

Chinese office action issued in connection with related CN Application No. 201480067368.8 dated Nov. 2, 2016.

Japanese Office Action issued in connection with related JP Application No. 2016513961 dated Nov. 8, 2016.

Japanese Notice of Allowance issued in connection with related JP Application No. 2013027200 dated Nov. 29, 2016.

Japanese Search Report issued in connection with Corresponding JP Application No. 2016029448 dated Jan. 25, 2017.

Japanese Notice of Allowance issued in connection with related JP Application No. 2016513961 dated Feb. 21, 2017.

Japanese Search Report issued in connection with related JP Application No. 2012269895 dated Mar. 21, 2017.

U.S. Non-Final Office Action issued in connection with Related U.S. Appl. No. 14/634,060 dated May 17, 2017.

First Office Action and Search issued in connection with corresponding CN Application No. 201580031462.2 dated Jul. 12, 2017.

Baldiga, J.D., et al., Cmc shroud support system, GE co-pending U.S. Appl. No. 61/824,491, filed May 17, 2013.

Schilling, J.C., et al., Shroud hanger assembly, GE co-pending U.S. Appl. No. 62/011,237, filed Jun. 12, 2014.

Shapiro, J.D., et al., Shroud hanger assembly, GE co-pending U.S. Appl. No. 62/011,244, filed Jun. 12, 2014.

Shapiro, J.D., et al., Cmc shroud support system, GE co-pending U.S. Appl. No. 61/915,114, filed Dec. 12, 2013.

Shapiro, J.D., et al., Shroud hanger assembly, GE co-pending U.S. Appl. No. 62/011,231, filed Jun. 12, 2014.

Japanese Office Acton issued in connection with related JP Application No. 2016-571372 dated Mar. 5, 2019.

* cited by examiner

SHROUD HANGER ASSEMBLY

CROSS-REFERENCE TO RELATED DOCUMENTS

The present application is a divisional of prior filed U.S. patent application Ser. No. 15/318,114 filed Dec. 12, 2016, which claims priority to PCT application serial number PCT/US2015/029236, filed on 5 May 2015, which claims priority to U.S. Provisional Patent Application Ser. No. 62/011,241 titled "SHROUD HANGER ASSEMBLY" filed on 12 Jun. 2014, the disclosures of which are incorporated by reference herein.

TECHNICAL FIELD

The present embodiments relate to a shroud hanger assembly for use in a gas turbine engine. More specifically, present embodiments relate to, without limitation, a shroud hanger assembly utilizing a shroud having at least one pocket which is retained by an arm depending from the retainer and further comprising a spring seal biasing the shroud.

BACKGROUND

A gas turbine engine includes a turbomachinery core having a high pressure compressor, combustor, and high pressure turbine ("HPT") in serial flow relationship. The core is operable in a known manner to generate a primary gas flow. The high pressure turbine includes annular arrays ("rows") of stationary vanes or nozzles that direct the gases exiting the combustor into rotating blades or buckets. Collectively one row of nozzles and one row of blades make up a "stage". Typically two or more stages are used in serial flow relationship. These components operate in an extremely high temperature environment, and must be cooled by air flow to ensure adequate service life.

Due to operating temperatures within the primary flow path of the gas turbine engine, it may be beneficial to utilize materials with low coefficient of thermal expansion. For example, to operate effectively in such strenuous temperature and pressure conditions, composite materials have been suggested and, in particular for example, ceramic matrix composite (CMC) materials. These low coefficient of thermal expansion materials have higher temperature capability than metallic parts. The higher operating temperatures within the engine result in higher engine efficiency and these materials may be lighter weight than traditionally used metals. However, such ceramic matrix composite (CMC) have mechanical properties that must be considered during the design and application of the CMC. CMC materials have relatively low tensile ductility or low strain to failure when compared to metallic materials. Also, CMC materials have a low coefficient of thermal expansion which differs significantly from metal alloys used as restraining supports or hangers for CMC type materials.

One use for low ductility material is in a turbine shroud. However, various problems are known to exist with shroud hanger assemblies. For example, while CMC may be beneficial for use with shrouds, the hanger may alternatively be formed of metal alloy. Therefore, the issue arises which has herertofore precluded use of low coefficient of thermal expansion materials in combination with metallic, that is how to deal with differential expansion between adjacent components.

Some hanger assemblies have utilized bolts and retainer structures adding components and weights.

It may also be beneficial to ensure that the shroud hanger assembly is properly sealed. Such sealing issues may develop due to thermal growth of parts of differing materials. Such growth may result in gaps between sealing surfaces and may be undesirable. Therefore, a sealing structure is needed due to the differential growth. Such structure also adds weight.

Additionally, the use of multi-piece hanger constructions made of a first material which may differ from the low ductility, low coefficient of thermal expansion second material defining a shroud may also result in air leakage which may be undesirable. It may be beneficial to overcome these and other deficiencies to provide a shroud hanger assembly which provides for sealing of the interfaces between parts of differing material and biases the parts to compensate for differential thermal growth therebetween.

The information included in this Background section of the specification, including any references cited herein and any description or discussion thereof, is included for technical reference purposes only and is not to be regarded subject matter by which the scope of the disclosure is to be bound.

BRIEF DESCRIPTION

A shroud hanger assembly or shroud assembly is provided for a gas turbine engine wherein a hanger includes a radially depending and axially extending arm. The arm or retainer engages a pocket formed in a shroud so as to retain the shroud in a desired position relative to the hanger. An aft retaining structure is provided on the hanger and provides a seat for a seal structure which biases the retainer so that the arm of the hanger maintains engagement in the shroud pocket. A baffle may be utilized at the hanger to cool at least some portion of the shroud.

According to some embodiments, a shroud hanger and shroud assembly comprises a shroud hanger having a forward leg, a rearward leg and a web extending between the forward and rearward legs, an arm depending from the web and having an axially extending portion, a shroud formed of a low thermal coefficient of thermal expansion material extending from the forward leg toward the rearward leg and having a pocket for receiving the axially extending portion, a retainer depending from the rearward leg and clipped thereto, and, a conformal seal applying an axial force to the shroud in an axial direction to maintain the retainer in the pocket.

This Brief Description is provided to introduce a selection of concepts in a simplified form that are further described below in the Detailed Description. This Brief Description is not intended to identify key features or essential features of the claimed subject matter, nor is it intended to be used to limit the scope of the claimed subject matter. All of the above outlined features are to be understood as exemplary only and many more features and objectives of the structures and methods may be gleaned from the disclosure herein. A more extensive presentation of features, details, utilities, and advantages of embodiments of the present invention is provided in the following written description of various embodiments of the invention, illustrated in the accompanying drawings, and defined in the appended claims. Therefore, no limiting interpretation of the Brief Description is to be understood without further reading of the entire specification, claims and drawings included herewith.

BRIEF DESCRIPTION OF THE ILLUSTRATIONS

The above-mentioned and other features and advantages of these embodiments, and the manner of attaining them, will become more apparent and the embodiments will be better understood by reference to the following description taken in conjunction with the accompanying drawings, wherein.

DETAILED DESCRIPTION

Figure 1:
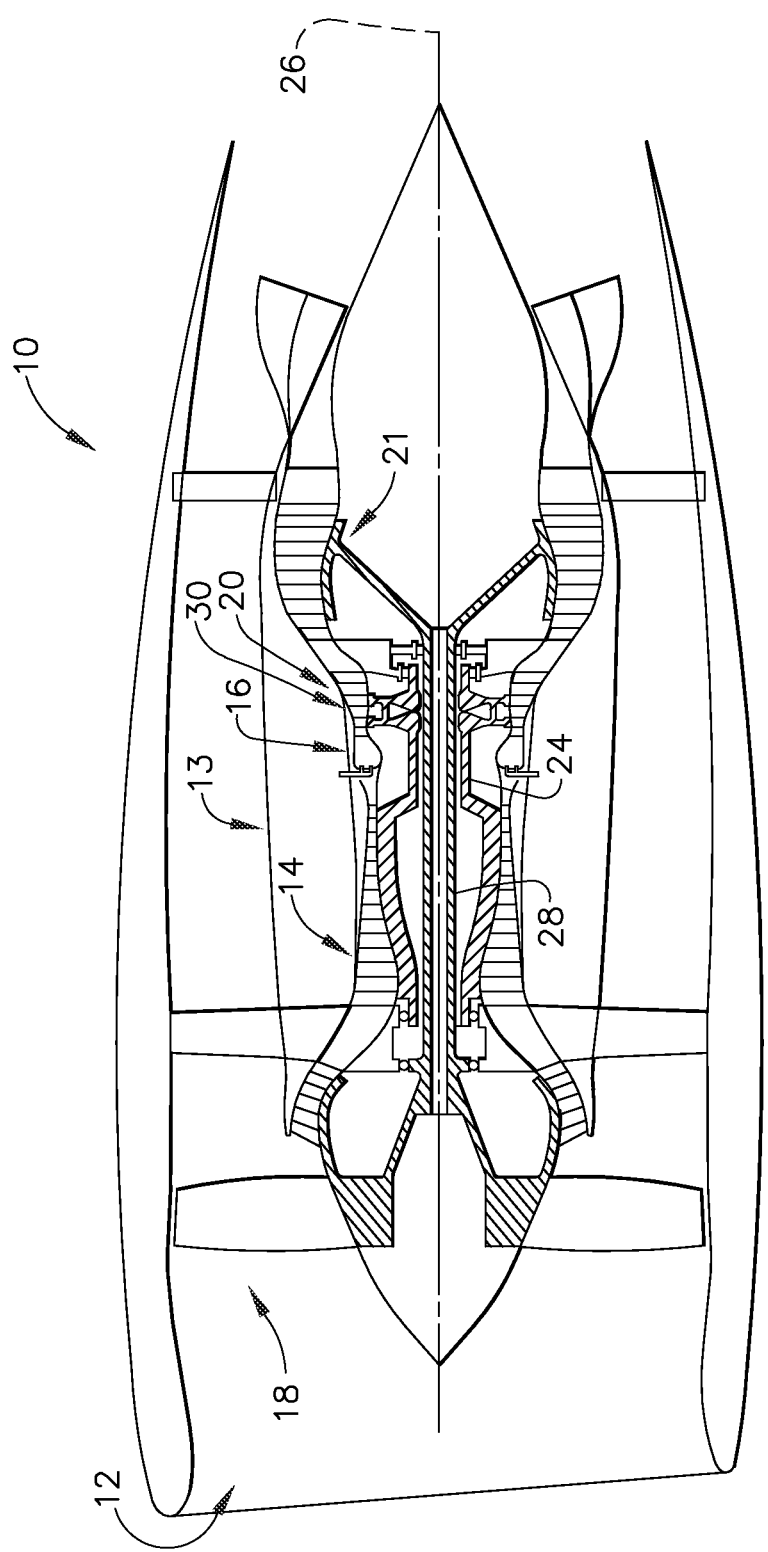
FIG. 1 is a side section view of an exemplary gas turbine engine.

It is to be understood that the depicted embodiments are not limited in application to the details of construction and the arrangement of components set forth in the following description or illustrated in the drawings. The depicted embodiments are capable of other embodiments and of being practiced or of being carried out in various ways. Each example is provided by way of explanation, not limitation of the disclosed embodiments. In fact, it will be apparent to those skilled in the art that various modifications and variations may be made in the present embodiments without departing from the scope or spirit of the disclosure. For instance, features illustrated or described as part of one embodiment may be used with another embodiment to still yield further embodiments. Thus it is intended that the present disclosure covers such modifications and variations as come within the scope of the appended claims and their equivalents.

Embodiments of a shroud hanger assembly are depicted in FIGS. 1-6. The shroud hanger assembly includes a hanger having a structural arrangement wherein the hanger provides a radial retaining feature for the shroud. According to one embodiment, the shroud is formed having a pocket which is engaged by an arm depending from the hanger web and extends axially so as to be positioned in the shroud pocket. A biasing force may be applied to the shroud in order to retain the shroud pocket in engagement with the arm. According to some embodiments, the hanger may have multiple arms and the shroud may have multiple pockets.

Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to moving in a direction toward the engine nozzle, or a component being relatively closer to the engine nozzle as compared to another component.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present disclosure, and do not create limitations, particularly as to the position, orientation, or use of embodiments of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring now to FIG. 1, a schematic side section view of a gas turbine engine 10 is shown. The function of the turbine is to extract energy from high pressure and temperature combustion gases and convert the energy into mechanical energy for work. The turbine 10 has an engine inlet end 12 wherein air enters the core or propulsor 13 which is defined generally by a compressor 14, a combustor 16 and a multi-stage high pressure turbine 20 all located along an engine axis 26. Collectively, the propulsor 13 provides power during operation. The gas turbine engine 10 may be used for aviation, power generation, industrial, marine or the like.

In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of the shaft 24. The shaft 24 passes toward the front of the engine to continue rotation of the one or more compressor stages 14, a turbofan 18 or inlet fan blades, depending on the turbine design. The turbofan 18 is connected by the shaft 28 to a low pressure turbine 21 and creates thrust for the turbine engine 10. The low pressure turbine 21 may also be utilized to extract further energy and power additional compressor stages.

Present embodiments are at least directed to a shroud hanger assembly 30 which is shown generically. The shroud hanger assembly 30 may be utilized to define a flow path adjacent to rotating parts such as turbine blades 20, 21 or blades within a compressor 14. The shroud hanger assembly 30 is shown schematically in the schematic FIG. 1 view. The assembly 30 may be disposed at a radially outward end of the turbine 20, 21 blades or the compressor 14 blades. As the blades of the turbine or compressor rotate, a shroud 50 (FIG. 2) in the assembly provides a flow path boundary.

Figure 2:
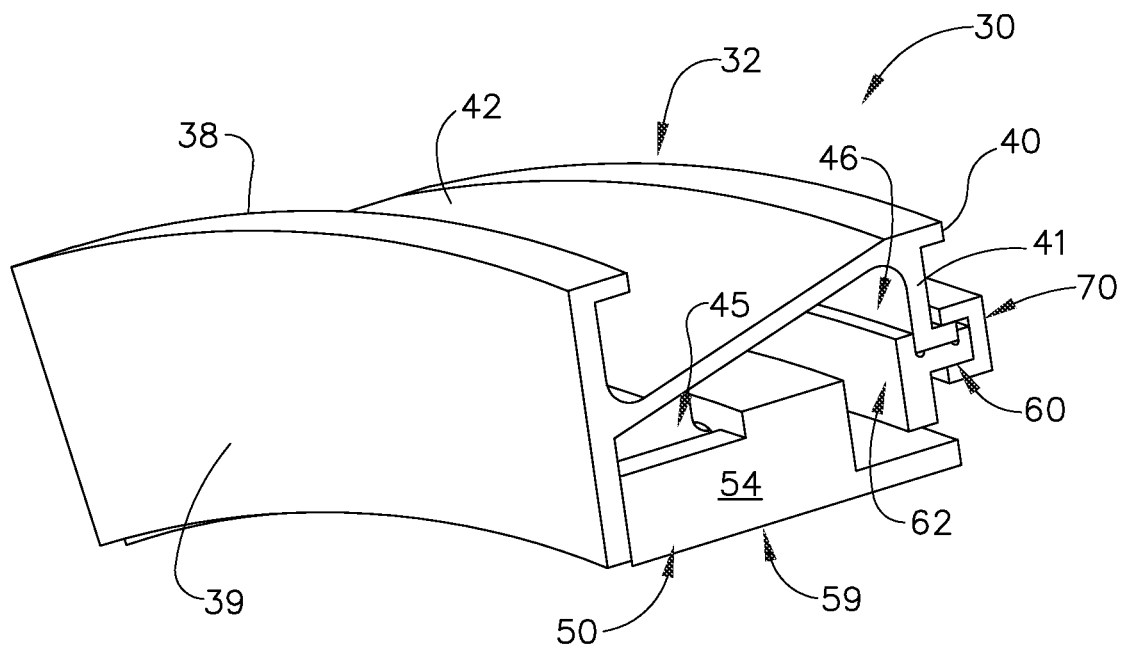
FIG. 2 is an isometric view of the shroud hanger assembly removed from the gas turbine engine.

Referring now to FIG. 2, an isometric view of an exemplary shroud hanger assembly 30 is depicted. The assembly 30 comprises a hanger 32 and shroud 50 which is mounted within the hanger 32 and a retainer 60 that is utilized to provide a spring seat for biasing force the shroud 50 into an engaged position with the hanger 32 precluding the possibility of the shroud 50 inadvertently falling radially downward from the hanger 32.

The hanger 32 may be a one-piece hanger or may be a multi-piece hanger assembly. The hanger 32 provides a position and structure to mount the shroud 50 in a fixed location. The shroud 50 provides an outer flowpath for the turbine or compressor. The hanger 32 is disposed radially outward of a turbine or compressor blade which rotates and has a radially outward position adjacent to the shroud 50. In the instant embodiment, the hanger 32 comprises a first tab 38 and a second tab 40. The tabs 38, 40 provide a structure which may be used to mount the hanger 32 to the engine casing. Depending from the first tab 38 is a leg 39 and depending from the second tab 40 may be a second leg 41. The tabs 38, 40 are shown extending in an axial direction but may alternatively be formed to extend at angles to the purely axial direction. Further, the tabs 38, 40 are shown extending from the forward to an aft direction. However, according to some alternatives, the tabs 38, 40 may be formed to extend in an aft to forward direction.

The legs 39, 41 may extend from the tabs 38, 40 in a purely radial direction or may be at an angle to the purely radial direction.

A web 42 extends from the first leg 39 toward the second leg 41 and the second tab 40. The web 42 defines a ceiling for the shroud such that a cavity 46 is formed by a portion of the first leg 39, at least a portion of the second leg 41 and the web 42.

The hanger 32 may be formed of various materials. According to some embodiments, the hanger 32 may be formed of a metallic material which has a relatively higher coefficient of thermal expansion. For example, the metallic material may be nickel based alloy. Further, according to other alternative embodiments, the hanger 32 may be formed of other materials such as relatively lower coefficient of thermal expansion materials. One such material may be a ceramic matrix composite or other composite material, where strength/load requirement, temperature and operating conditions allow for the use of such material.

Figure 3:
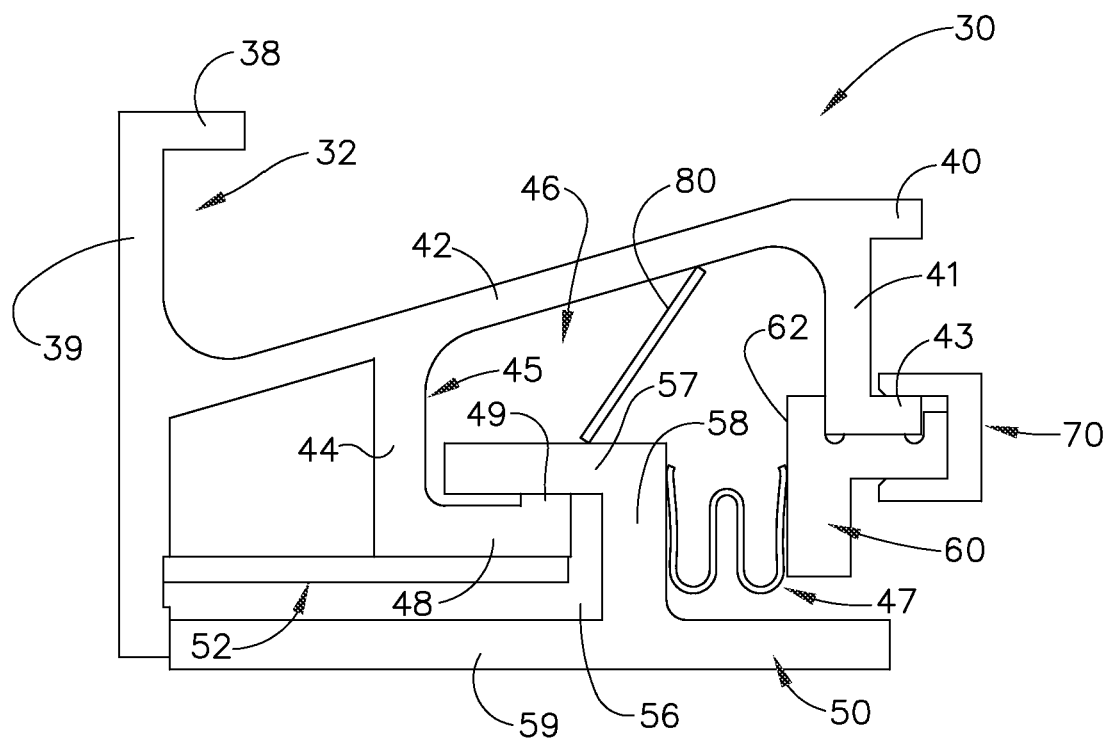
FIG. 3 is a side section view of the assembly of FIG. 2.

Located within the cavity 46 of the web 42 is a shroud 50. The shroud 50 has a lower surface 59 which defines a flow path boundary for the turbine 20 (FIG. 1). The shroud 50 is retained in the cavity 46 in the radial direction by an arm 45 (FIG. 3). The arm 45 may be formed in one or more sections which may be integrally formed or may be joined in subsequent manufacturing steps. The arm 45 depends from the lower surface 59 of the web 42 and extends in an axial direction. The shroud 50 is formed with a pocket 56 (FIG. 3) which received the arm and retains the shroud 50 in a desired position in the radial direction. The shroud 50 includes a slash face 54 which may engage the arm 45 so as to limit circumferential movement of the shroud 50 within the cavity 46.

Spaced in the aft direction of the shroud 50 is a retainer 60 which is connected to the radially inward end of the second leg 41. The retainer 60 may or may not be considered a portion of the hanger 32. The retainer 60 may have various forms but includes a surface 62 which defines a seat for a spring seal. According to the instant embodiment, the retainer 60 has an inverted "h" shape, but this is not limiting. The retainer 60 may be connected to the second leg 41 by a c-clip 70.

Referring now to FIG. 3, the shroud hanger assembly 30 is shown in side section view. The shroud hanger assembly 30 includes hanger 32, shroud 50 and a seal 47. As previously described, the hanger 32 includes first and second tabs 38, 40 which function to connect the assembly 30 to an engine casing. Depending from the first tab 38 is a first leg 39 and a second leg 41 depends from the second tab 40. A web 42 extends between the first leg 39 and the second leg 41 and tab 40. The web 42 is shown having a linear shape. The web 42 may be formed of a linear structure which is angled or which may be axial in extension. Further, according to some embodiments, the web 42 may be formed of two or more linear sections or may be curvilinear or a combination of curvilinear or linear sections. The web 42 extends in a circumferential direction to define an arcuate segment of preselected circumferential length defining the hanger segment in part.

Depending from the web 42 is an arm 45 which extends downwardly. The arm 45 may depend in a radial direction or at some angle to the radial direction of the engine. The arm 45 is defined by the first portion 44 which extends downwardly and a second portion 48 which extends in an axial direction. The second arm portion 48 may include a shoulder 49 wherein the arm provides a retaining feature for the shroud 50.

The shroud 50 is shown having a shroud base 59 and an upstanding shroud portion 58 and an axial shroud portion 57. The axial and radial portions 57, 58 may be formed integrally with base 59 and may have various shapes, one of which may be an L-shaped feature. The radially extending portion 58 of the shroud 50 has a length such that the axial portion 57 is engages the shoulder 49 and positions the shroud 50 in a radially acceptable location relative to the turbine blades which rotate beneath the base 59. The radial and axial portions 58, 57 in combination with the base 59 define a pocket 56 wherein the arm 45 is at least partially positioned. Thus, the arm 45 functions as an integral radial locator for the shroud 50 and also inhibits removal of the shroud 50 from the cavity 46 of the hanger 32.

In order to retain the arm 45 properly positioned within the pocket 56, one or more springs may be used to provide either or both of axial and radial force. Positioned above the shroud 50 and depending from the web 42 is an assembly spring 80. The spring 80 places a downward force on the upper portion 57 of the shroud 50 forcing it downwardly against the arm 45, and specifically the shoulder 49. Further, a conformal seal 47 is depicted engaging the radially extending portion 58 of the shroud 50. The seal 47 forces the shroud 50 in an axially forward direction so that the arm 45 remains engaged within the pocket 56 and the shroud may not unintentionally be removed from this engagement. The conformal seal 47 is shown as a W-shape in cross section, having linear segments and angled peaks and valleys. However, the spring may also have curved peaks and valleys as an alternative. Other forms of biasing springs are utilized which also form a seal type structure in annular form and preclude undesired air leakage between the hanger 32 and the shroud 50. Further, while two springs are shown, the springs may include two axial springs or other biasing forms.

Depending from the second leg 41 is a foot 43 such that the foot 43 and leg 41 form a non-limiting L-shape structure. Depending from the foot 43 is the retainer 60 which has a generally H-shaped configuration including the engagement surface 62 for engagement of conformal seal 47. The retainer 60 and leg 41, including foot 43, are retained together by a c-clip 70. The clip 70 engages both structures and retains such structures together by interference between the two structures providing a solid structure against which the seal 47 may bias shroud 50.

Figure 4:
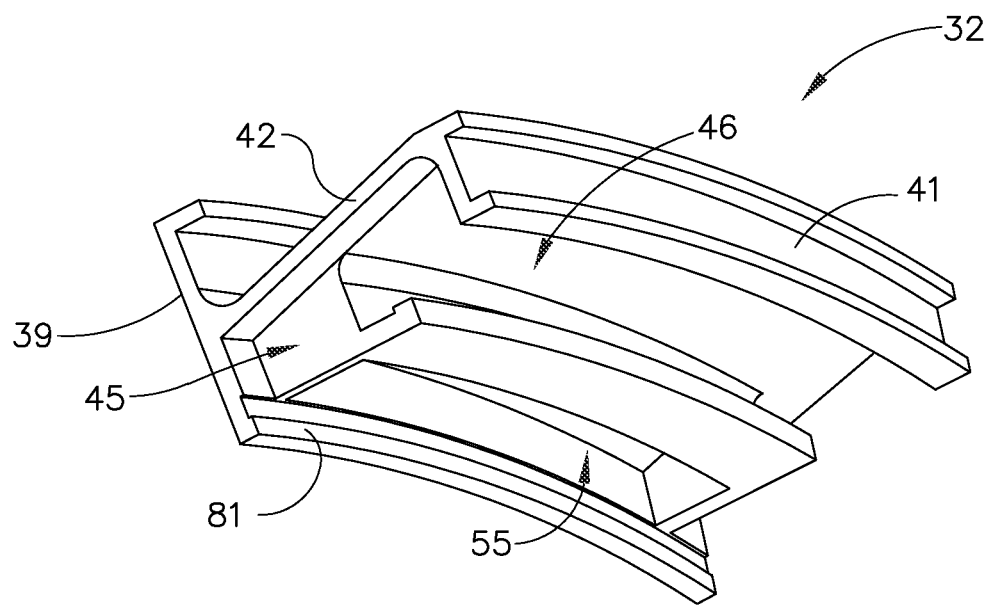
FIG. 4 is a lower isometric view of the hanger with the shroud removed.

Referring now to FIG. 4, an isometric view of the hanger 32 is shown from a lower view looking upward. Within the cavity 46, the arm 45 depends from the web 42 and includes an open volume 55 wherein flowing air passes through the hanger 32 to the baffle 52. The baffle 52 may be disposed beneath the arm 45 or within the volume 55. In this view, a baffle seat 81 is located on the aft surface of the first leg 39. The baffle seat 81 is an arcuate groove extending through the first leg 39 from the first circumferential end to the second circumferential end. Alternatively, the baffle seat 81 may extend chordally. According to some embodiments, the seat 81 may extend from one end of the hanger 32 to the opposite end or may be formed in one or more segments. The volume 55 may be in flow communication with cooling apertures extending through the hanger 32.

Figure 5:
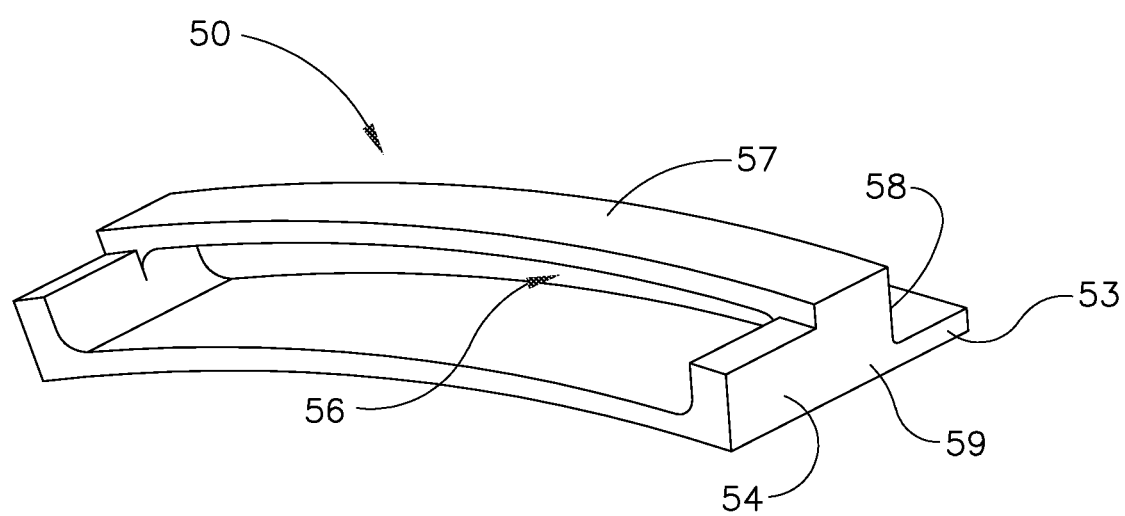
FIG. 5 is an isometric view of an exemplary shroud removed from the hanger; and, FIG. 6 is a side section view of an alternative embodiment wherein the shroud has multiple pockets and the hanger has multiple retaining arms.

Referring now to FIG. 5, the shroud 50 is shown. In this view, the pocket 56 is depicted beneath the portion 57 and between the slash face walls 54. The pocket 56 receives flow communication from the baffle 52 (FIG. 3) such that at least the forward portion of the shroud 50 may be cooled. The shroud 50 further comprises an overhang 53 which is located rearward or aft of the radial portion 58 of the shroud 50.

According to other embodiments, the shroud 50 may have pockets extending in an aft direction so as receive an arm from an aft extending forward position in addition to or alternatively to the arm design depicted. Further to this embodiment, a spring may be located at a forward position of the shroud 50 so as to bias the shroud 50 rearwardly onto such alternative arm design.

Figure 6:
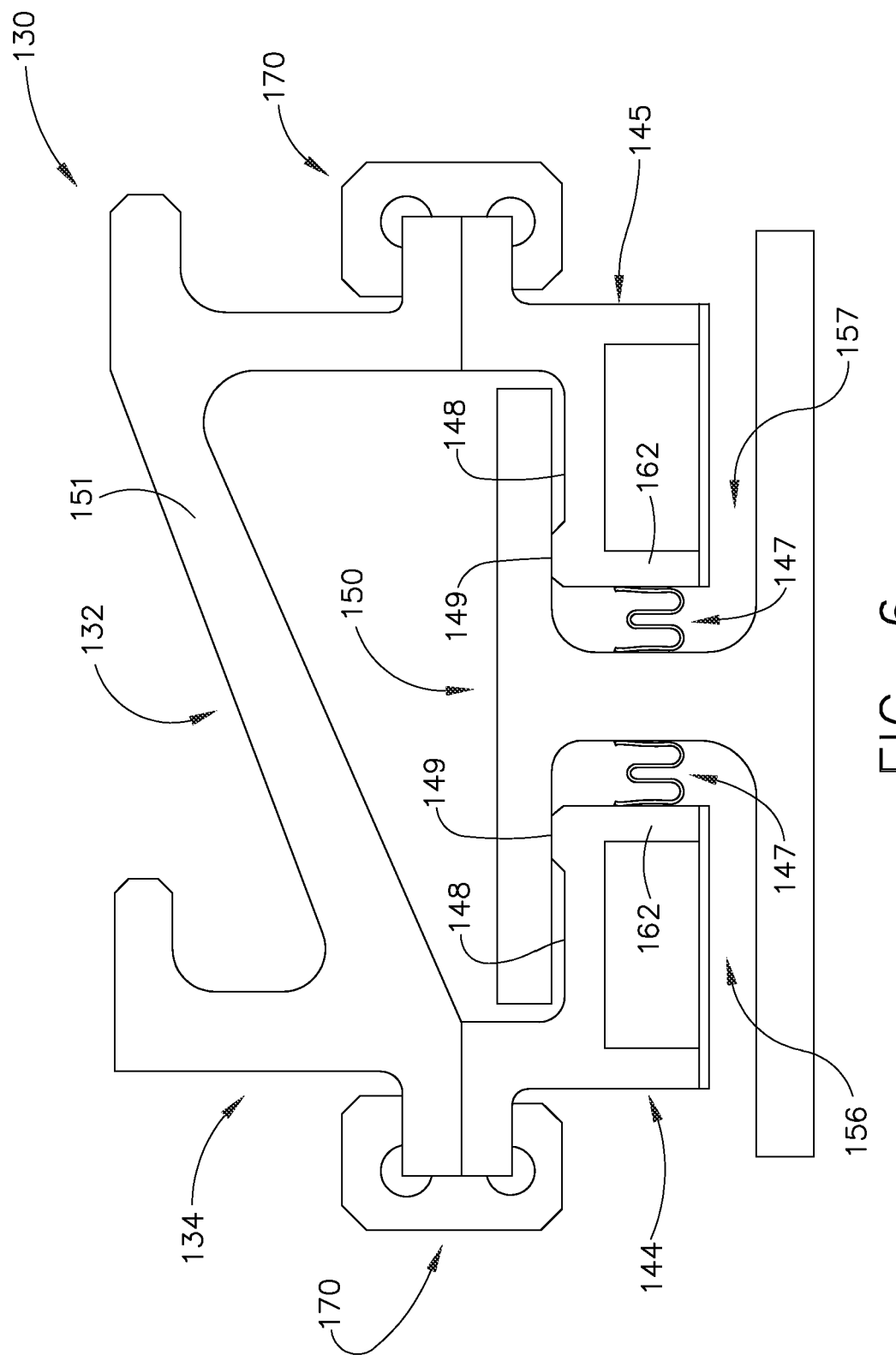

Referring now to FIG. 6, a side section view of an alternate embodiment is depicted. The alternate embodiment comprises a shroud hanger assembly 130. As previously indicated, the hanger 132 may be formed of one or more parts to define a multi-piece hanger assembly. In the instant embodiment, a first hanger portion 134 includes tabs for connecting the hanger 132 to an engine casing. The lower portion of the assembly 132 includes arms or retainers 144, 145. The first hanger portion 134 is seated against the retainers 144, 145 and clipped together with a C-clip 170. The retainers 144, 145 may take various forms but each include an axially extending portion 148 and a shoulder 149. The retainers further comprise spring seats 162 which according to exemplary embodiments, depend in a radial direction from the shoulders 149 and axial portions 148. According to some embodiments the retainers 144, 145 may be integrally formed with the first hanger portion 134 or alternatively, may be formed separately and joined together in various fashions as depicted. Conformal springs or seal springs 147 extend from the spring seats 162 to a shroud 150.

As discussed previously, the shroud 150 may take various forms and according to the instant embodiment the shroud 150 includes first and second pockets 156, 157. According to the instant exemplary embodiment, the shroud 150 is I-shaped in cross-section so that the two pockets 156, 157 are forms on forward and aft sides of a web 151. Various forms of cross-sectional shapes may be utilized to allow for application of two or more pockets on the shroud. Further, the pockets may be aligned in the axial direction or may be offset circumferentially along the axial direction.

The foregoing description of several embodiments of the invention has been presented for purposes of illustration. It is not intended to be exhaustive or to limit the invention to the precise steps and/or forms disclosed, and obviously many modifications and variations are possible in light of the above teaching. It is intended that the scope of the disclosure and all equivalents be defined by the claims appended hereto.

What is claimed is:

1. A shroud hanger assembly, comprising:
a shroud hanger having a forward leg, a rearward leg and a hanger web extending between said forward and rearward legs;
a plurality of retainers depending from said forward and rearward legs, respectively, each of the plurality of retainers having an axially extending portion;
a shroud formed of a low thermal coefficient of thermal expansion material extending from said forward leg toward said rearward leg and defining opposing pockets on opposing sides of a shroud web, each pocket for receiving one of said axially extending portions of each of the plurality of retainers; and
opposing conformal seals applying opposing axial forces to the shroud web in an axial direction to maintain said each of plurality of retainers in their respective pockets.

2. The shroud hanger assembly of claim 1, wherein said shroud hanger is a one-piece hanger.

3. The shroud hanger assembly of claim 1, wherein said shroud hanger is a multi-piece hanger.

4. The shroud hanger assembly of claim 1, wherein said low coefficient of thermal expansion material is ceramic matrix composite (CMC).

5. The shroud hanger assembly of claim 1, wherein each of said plurality of retainers is a separate component connected to said shroud hanger.

6. The shroud hanger assembly of claim 1, wherein each of said plurality of retainers is clipped to said shroud hanger.

7. The shroud hanger assembly of claim 1, wherein the opposing pockets comprises a first, forward facing pocket and a second, rearward facing pocket.

8. The shroud hanger assembly of claim 7, wherein said shroud is I-shaped.

9. The shroud hanger assembly of claim 1, wherein said opposing conformal seals are aligned in an axial direction.

10. The shroud hanger assembly of claim 1, wherein said opposing conformal seals act in an aft to forward direction.

11. The shroud hanger assembly of claim 1, wherein said shroud hanger comprises a first hanger portion.

12. The shroud hanger assembly of claim 1, wherein the shroud hanger comprises tabs for connecting the shroud hanger to an engine casing.

13. The shroud hanger assembly of claim 1, wherein a lower portion of the shroud hanger comprises the plurality of retainers.

14. The shroud hanger assembly of claim 11, wherein the first hanger portion is seated against the plurality of retainers and clipped together with a C-clip.

15. The shroud hanger assembly of claim 1, wherein each of the plurality of retainers comprise a shoulder.

16. The shroud hanger assembly of claim 15, wherein the plurality of retainers each comprise a spring seat that depends in a radial direction from the shoulders and the axially extending portions.

17. The shroud hanger assembly of claim 16, wherein each of the opposing conformal seals extend from the spring seats towards the shroud.

* * * * *